Patented Nov. 6, 1934

1,979,379

UNITED STATES PATENT OFFICE 1,979,379

ZINC-BASE WHITE PIGMENT AND PROCESS OF MAKING THE SAME

Henry A. Gardner, Washington, D. C.

No Drawing. Application January 16, 1931, Serial No. 509,263

2 Claims. (Cl. 134—78)

The present invention relates to the production of white pigments having a zinc base, which pigments have improved or different properties from those of present zinc pigments. The invention relates more specifically to the production of white zinc-base composite pigments having commercially valuable properties.

It is known that when ordinary commercial zinc oxide pigment is ground with an oil or varnish which is slightly acid in reaction, and especially in a tung oil varnish in which are highly polymerized bodies, reactions occur which result in a bodied mass which is difficult to use. Thus, for instance, the coating composition produced by grinding ordinary zinc oxide with a known ester gum-China-wood oil varnish, and especially with similar varnishes made with esterified rosin-phenol formaldehyde resins or with glycerine phthalates, may, within a period of two or three days after preparation, set up to a condition known as "livered", the bodied mass being quite stiff and poorly adapted to being brushed out into a film. This effect is supposed to be due to interactions between certain acids (of fatty or resinous nature) in the varnish and basic components of the pigment, whereby there are formed compounds giving the unsatisfactory gel-like structure to the whole product.

As an indication of the seriousness of this difficulty, it is of interest to point out that lithopone or pure zinc sulphide, or mixtures of these pigments, of practically all commercial brands now on the market, contain usually up to one percent and sometimes one and one-half percent of zinc oxide which is incidental or accidental to the process of manufacture. Even this small amount of zinc oxide is so reactive that it is supposed to be the cause of the livering which takes place when these pigments are used with varnishes. In fact, at the present time manufacturers are striving to rid these products of zinc oxide or at least reduce the zinc oxide content to a much lower percentage, with the thought that products so produced might be less susceptible to reaction with varnishes.

Of course, zinc oxide as such is not used in active varnishes to produce enamels, because of the livering difficulties, but manufacturers desire to use zinc oxide in such products if they could, on account of the fact that zinc oxide gives to an enamel a very high gloss which is not obtainable with many other types of pigments, and also because of other desirable characteristics such as non-chalking and greater durability when these enamels are used as porch and deck coatings.

In this specification, whenever I refer to zinc-base pigment, such a product might be defined as a pigment having a base of zinc oxide or zinc sulphide. When I refer to zinc oxide pigment, I refer to zinc oxide as such or zinc oxide which contains lead sulphate as an incidental ingredient due to the process of manufacture. Thus, for instance, when zinc ores are furnaced to produce a fume pigment, the lead content of these zinc ores naturally forms a fume which becomes a portion of the final condensed pigment, the final product being zinc oxide with certain amounts of lead sulphate. For instance, practically all zinc oxide, except that produced from the highest grade pure spelter, will contain traces of lead sulphate which may range from 0.1 percent up to as high as 35 percent lead sulphate, the balance being pure zinc oxide.

An object of the present invention is the provision of a white zinc-base pigment which is neutral in reaction, which pigment may be ground with oil or varnish having an acid reaction without subsequent "livering" of the product. Another object of invention is the provision of a white zinc-base pigment which exhibits improved "weathering" properties, and which repels water well. Other objects of invention include: the provision of such a pigment which while being substantially non-wettable with water is wetted easily with oil; the provision of such a pigment which exhibits a lower oil absorption ratio than that of ordinary zinc oxide; which may be suspended in oil in a relatively stable fashion, and which will compound with rubber readily and easily.

I have discovered that the above, and other, desirable results are attained by a process which in effect consists in coating or enveloping particles of a white zinc-base pigment with a film of a water-insoluble zinc compound which may be a water-insoluble zinc salt of an organic or inorganic acid. To accomplish this, I may treat the zinc-base pigment, suspended in a liquid vehicle which may be water, with a small but effective amount of an acid (such, for instance, as oxalic, oleic, tung oil acids, stearic or resinic acid) which is capable of forming a water insoluble zinc salt; or, I may treat the pigment with an alkali metal salt of an acid, e. g., an organic acid (say, with ordinary soap), whereby to supplant the alkali metal by zinc, forming the water-insoluble zinc salt either by direct interaction with the zinc base pigment or through subsequent precipitation. In either event, the resulting product is a composite pigment each particle of which consists principally of zinc-base pigment with a relatively small amount of the water-insoluble zinc salt coating the surface thereof as a protective film. The zinc-base pigment which I use as starting material comprises commercial zinc oxide; it may consist exclusively of the zinc oxide; it may consist of zinc oxides produced from leaded ores and which therefore usually contain from 1 to 35% of lead sulphate, or it may consist of a combination or association of these zinc oxides and commercial zinc sulphide in suitable proportions. In the case of any of these starting materials the treatment above described so modifies the particles of pigment, or at least the surface layers thereof, that the resulting product is immune to attack by acidic oils or varnishes and exhibits the desirable properties to which reference has been made above.

The invention will be described in greater particularity with reference to the following illustrative specific examples:

Example I 100 grams of ordinary commercial zinc oxide pigment is stirred into 200 grams of water, more or less, containing about 5% of oxalic acid dissolved therein. The suspension may, if desired, be heated during the stirring, in order to expedite the reaction between the oxalic acid and the zinc oxide. Thereby there is formed upon the surface of the zinc oxide particles zinc oxalate as a very water-insoluble coating. When leaded zinc oxide is employed, the reaction produces a white, water-insoluble coating of lead and zinc oxalates on the base pigment. The pigment product is then filtered, washed, and dried.

When the resulting product is ground with oils which are slightly or even highly acidic in nature, no reaction occurs between the components, the resulting paint remaining in a smooth, fluid, and usable condition.

Example II 6 pounds of an ordinary commercial soap consisting essentially of alkali metal salts of oleic and stearic acids, such as the soap known in commerce by the trade-mark "Ivory", are dissolved in 200 pounds of warm water, a slightly opalescent liquid resulting. While the liquid is still warm there is added thereto 100 pounds of zinc oxide, the mixture is heated up to about 200° F., or even to the boiling point, and is stirred for five minutes. During this period, basic constituents of the zinc oxide react with the soap to produce on the surface of the pigment particles zinc salts of the soap acids (that is, zinc oleate and zinc stearate) as a coating thereon. As an evidence of this reaction, the opalescence of the water solution of the soap almost immediately disappears and becomes crystal clear. The product after being filtered, washed, and dried, is ready for use.

In case the pigment has not been heated or boiled for a sufficient period to withdraw the total fatty acid content of the soap from solution, and it is desired to hurry the procedure, the operation may be finished by adding to the suspension a relatively small amount of zinc chloride, zinc sulphate or other water-soluble zinc salt, which precipitates any unacted upon portion of the soap thus producing zinc oleate and/or zinc stearate which coats over the particles of pigment.

Instead of the sodium oleate and/or sodium stearate of the above example I may employ an aqueous emulsion of the free acid or acids: since it is not so convenient to work with such emulsions, I prefer to use the salts of the fatty acids.

Also, in place of the sodium salts of fatty acids, I may with very good success use sodium resinates: with these the desired reaction is almost immediate, the zinc oxide withdrawing from the water solution of the sodium resinate, within a few minutes, the entire quantity of resinic acid whereby to form a zinc resinate coating on the zinc oxide particles.

The pigment product obtained by the carrying out of the process of any one of the foregoing examples may be ground in oil, or varnish, having an acidic reaction to produce film-forming compositions which may be kept for long periods of time without showing any pronounced settling or hardening of the pigment, or gelling or "livering" of the composition. The impurities present in the ordinary commercial zinc oxide, including traces of sulphur and chlorine compounds, apparently are washed out of, or neutralized in, the pigment during the treatment hereinbefore set out, the resulting pigment being neutral insofar as such impurities are concerned.

The said pigment product repels water in a manner and to an extent heretofore unknown with respect to zinc-base pigments. This fact is illustrated when small samples of my product and of untreated zinc oxide separately are dropped into water: the particles of the former do not immediately sink to the bottom and there remain, as is the case of the particles of the latter, but form spherical globular masses which appear to float about in the water and even on the surface of the water to some extent. Air bubbles are seen to adhere to the exteriors of these masses. All of these phenomena are believed to be due to the non-wetting properties of the composite pigment. Not only has the composite pigment an increased water-repellance but also it shows an improved resistance to the conditions encountered in "weathering": a paint prepared therefrom has remained in good condition as a protective coating after a period of accelerated exposure to ultra-violet radiation, heat and water spray cycles in an accelerated test cabinet for a period approximating two years' actual exterior exposure to rain and sunlight, as contrasted with the much shorter life of paints made from zinc oxide which has not been so treated.

Another characteristic of the composite pigment is its lower oil absorption ratio as compared to that of the pigment from which it was produced. Thus, for instance, I have found that the oil absorption ratio—as determined by the standard test for oil absorption of pigments—of a zinc oxide may often be reduced as much as 25% by forming on the surface of the zinc oxide particles approximately 5% by weight of zinc stearate in accordance with any one of the methods heretofore described. This, as well as the above-described increased water-repellance, may possibly be ascribed in part to the fact that the boiling treatment apparently produces aggregations of the particles of treated pigment. In this absorption determination 100 grams of the pigment were mulled with linseed oil, the oil being added by small measured portions until it was determined that the pigment had become fully saturated with the oil: it was found that the untreated pigment required 12 grams of oil per 100 for complete saturation, as opposed to 9 grams of oil in the case of the composite pigment. However, when paints were separately but comparably prepared from the two pigments making them up with say 60% of pigment and 40% of oil, it was found that the paint from the untreated pigment was at first thinner in body than that from the composite pigment, but rapidly increased in "body" upon aging, finally becoming so thick as to be unsatisfactory for use whereas the paint containing the composite pigment had at first a more desirable "body" and remained more constant in mobility through th aging period. It showed, too, improved suspendability in the oil; it did not settle out of the oil to the extent or with the rapidity of untreated zinc oxide particles. In grinding the composite pigment with oil it is found that the particles wet well with the oil and grind readily and easily; in other words, they have improved lubricating properties.

This improvement in lubricating properties also is evidenced in the compounding of the composite pigment with rubber, in that the said pigment more readily mixes or "compounds" with the rubber than does zinc oxide which has not been so surface-treated.

It is of interest to state at this point that when zinc oxide is mixed with rubber latex, the rubber latex is thrown out of solution by the zinc oxide, coating over the particles of zinc oxide, whereas this phenomenon does not occur when I use my stearated zinc oxide with rubber latex. In other words, the electrical charge on the pigment or other features which are responsible for the precipitation referred to above are overcome when my stearated pigments come in contact with rubber latex. As a matter of fact, in some of my work I have first treated zinc oxide with a dilute solution of rubber latex to coat over the particles of zinc oxide with rubber, and, after washing and drying the pigment, I have then suspended it in rubber latex without showing any precipitation of the rubber latex in which it is suspended.

As has been noted in the foregoing general description, the base material of my composite pigment need not consist exclusively of zinc oxide but may comprise an association or combination of zinc sulphide and zinc oxide. As is known, one objection against the use of zinc sulphide as a component of exterior paints resides in the fact that, under some severe conditions of weathering, the pigment may oxidize partially to zinc sulphate producing thereby products whose solubility properties may detrimentally affect the paint film. I have found, in this connection, that if zinc sulphide be associated with the zinc oxide during the process of forming on the latter the hereinbefore described envelope of water-insoluble zinc salt, the resulting composite pigment is not susceptible to this oxidation tendency and stands weathering well. In making this type of pigment, I may bring together equimolecular proportions of zinc oxide and zinc sulphide, that is to say, substantially 79 parts by weight of the former with 95 parts of the latter, or the zinc sulphide may be used in a lesser ratio. The treating agent may be any one of the agents hereinbefore described. I prefer to use, with 79 parts of zinc oxide, only 21 parts of zinc sulphide: this composite pigment, enveloped in the aforesaid film of zinc salt, evidences a desirable and unexpected hiding power which appears to be at least 20% greater than that of a mere mechanical mixture of the oxide and sulphide. A process by which this particular composite pigment may be prepared is as follows:

*Example III*

79 parts by weight of ordinary commercial zinc oxide and 21 parts by weight of the ordinary zinc sulphide are added with stirring to 200 parts of water containing in solution approximately 5 parts of sodium stearate. The suspension is heated up to boiling, and boiled for about ten minutes, with agitation, to secure the desired reaction. Thereafter there is added a relatively small amount of zinc sulphate (to precipitate any unacted upon stearate). Thus there is formed a composite pigment which may contain approximately 5% of zinc stearate as an enveloping film on the surfaces of the pigment particles. The pigment is then filtered, washed, and dried. Instead of sodium stearate there may be used with equal success sodium resinate, sodium tungate, or in fact any of the agents hereinbefore named. The resulting product has an oil absorption ratio of about 8.2 as distinguished from the oil absorption ratios of the oxide and sulphide starting materials which were 12 and 15, respectively. This extremely low absorption ratio may be due to aggregation of the particles, and/or to elimination from the starting materials of acidic or other impurities, and/or to an actual coalescence of the zinc sulphide with the zinc oxide with the possible formation of a complex compound resembling zinc oxysulphide. Apparently the two components are closely bound together in the particles of the finished product, and are of course surface-coated with the reaction products of the zinc with the treating acid.

A sample of the product produced in accordance with the process of the foregoing example was ground into the form of a paint having 67% pigment concentration, which paint had a hiding power shown to be equivalent to 25.1 square feet per pound of pigment; the zinc oxide starting material, by comparison test, had a hiding power of only 16.9 square feet per pound of pigment, and the zinc sulphide a hiding power of 38.1. It will be apparent therefrom that my new pigment has 20% greater hiding power than would be expected if I had made a mere mechanical admixture of the two zinciferous components in the proportion of 79 parts ZnO to 21 parts ZnS. The "black and white contrast brushout method", as well as the "Cryptometer", were used in making the above determination as to hiding power. This unexpected increase in hiding power in the particular combination described apparently parallels the improved properties obtained by bringing together in proper proportions the components of lithopone, or of the titanium oxide-barium sulphate composition having 1 part of the former to 3 of the latter, which composition shows an increased hiding power over that to be expected from the addition of the 25% of titanium oxide.

*Example IV*

60 parts by weight of leaded zinc, a product produced as a fume pigment from leaded zinc ores, and which contains approximately 65 parts of zinc oxide combined with 35 parts of lead sulphate, are placed in a container with 200 parts by weight of water. There is then added 40 parts by weight of commercially pure zinc sulphide. There is then added 5 parts by weight of an ordinary household soap dissolved in 100 parts by weight of water. The suspension is heated to boiling and boiled for about 5 minutes with agitation to secure the desired reaction. Thereafter there is added a relatively small amount of zinc sulphate to precipitate any unacted upon soap. There is thus formed a composite pigment which may contain approximately 5% of zinc stearate as an enveloping film on the surface of the pigment particles. The pigment is then filtered, washed and dried. The analysis of this pigment, with the exception of the zinc stearate coating would show approximately 40% zinc oxide, 40% zinc sulphide, and 20% lead sulphate. This pigment I find especially desirable for use in exterior house paints. It may be used without admixture with any other pigment, as its weathering properties are very good.

In making the several determinations set out above the samples were subjected to the standard tests for oil absorption, hiding power, and the like, described in "Physical and Chemical Examination of Paints, Varnishes, Lacquers and Colors", Gardner, 5th ed., October 1930.

I claim:

1. As a new product, a white zinc-base pigment containing zinc oxide as an essential component, the particles of which pigment are individually coated with a film of a water-insoluble zinc salt of oxalic acid.

2. Process which comprises treating zinc-base pigment particles of at least 40% zinc oxide content while suspended in a liquid vehicle with a relatively small but effective amount not materially in excess of about 5% of oxalic acid, whereby to form an enveloping film of zinc oxalate about each of the said particles, and thereafter separating the resulting solid product from the liquid vehicle.

HENRY A. GARDNER.